United States Patent [19]

Valdes

[11] 4,115,772

[45] Sep. 19, 1978

[54] PSEUDO-NOISE RADAR SYSTEM

[75] Inventor: Sergio F. Valdes, Canyon Country, Calif.

[73] Assignee: International Telephone and Telegraph Corporation, New York, N.Y.

[21] Appl. No.: 593,219

[22] Filed: Jul. 7, 1975

[51] Int. Cl.² ............................................... G01S 9/56
[52] U.S. Cl. ................................... 343/6.5 R; 343/14
[58] Field of Search ................ 343/6.5 R, 14, 6.5 LC

[56] References Cited

U.S. PATENT DOCUMENTS

| | | | |
|---|---|---|---|
| 2,222,587 | 11/1940 | Sanders, Jr. | 343/14 |
| 3,130,404 | 4/1964 | Fried | 343/14 |
| 3,290,677 | 12/1966 | Jacob | 343/6.5 R X |
| 3,659,292 | 4/1972 | Martin et al. | 343/6.5 R |
| 3,900,873 | 8/1975 | Bouvier | 343/6.5 R X |
| 4,051,472 | 9/1977 | Albanese et al. | 343/5 PD |

*Primary Examiner*—Malcolm F. Hubler
*Attorney, Agent, or Firm*—W. T. O'Neil

[57] ABSTRACT

A pseudo-noise radar system in which a maximal length binary pulse code of amplitude zero or A amplitude modulates a carrier wave and reverses the phase thereof 180 degrees in synchronism. Either one of the amplitude modulated or phase reversed waves is transmitted. The received wave is then passed through a multiplicative mixer that receives the other wave as an input. The mixer output is then effectively (L + 1)/2 when correlated and effectively zero when phase shifted one bit to one bit less than a word, where L is the word length. Signals not correlated are thus attenuated to an extreme degree. The above-described pseudo-noise radar system may be used with any other conventional equipment for fire control, missile range and/or velocity tracking or otherwise.

3 Claims, 11 Drawing Figures

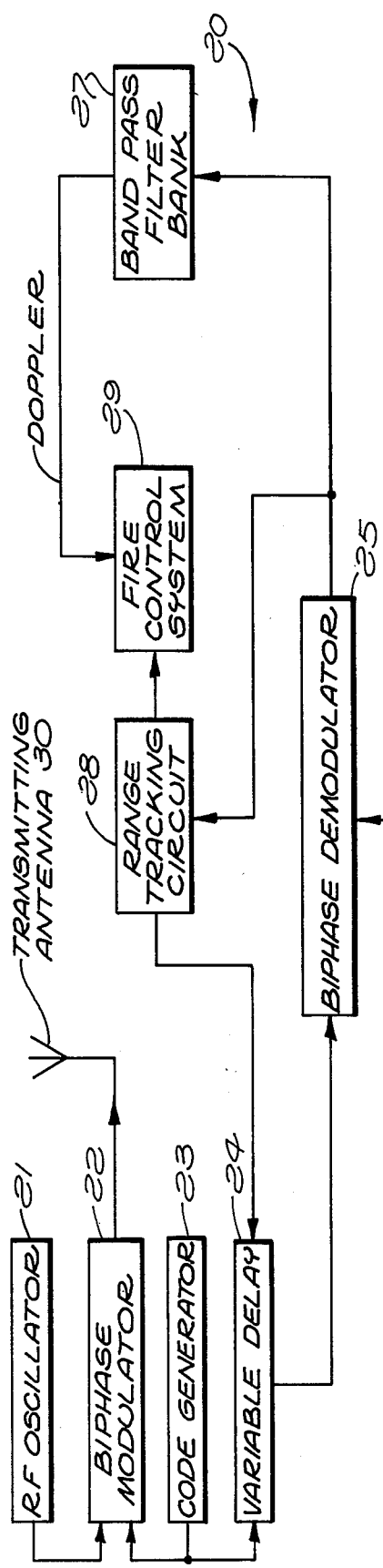
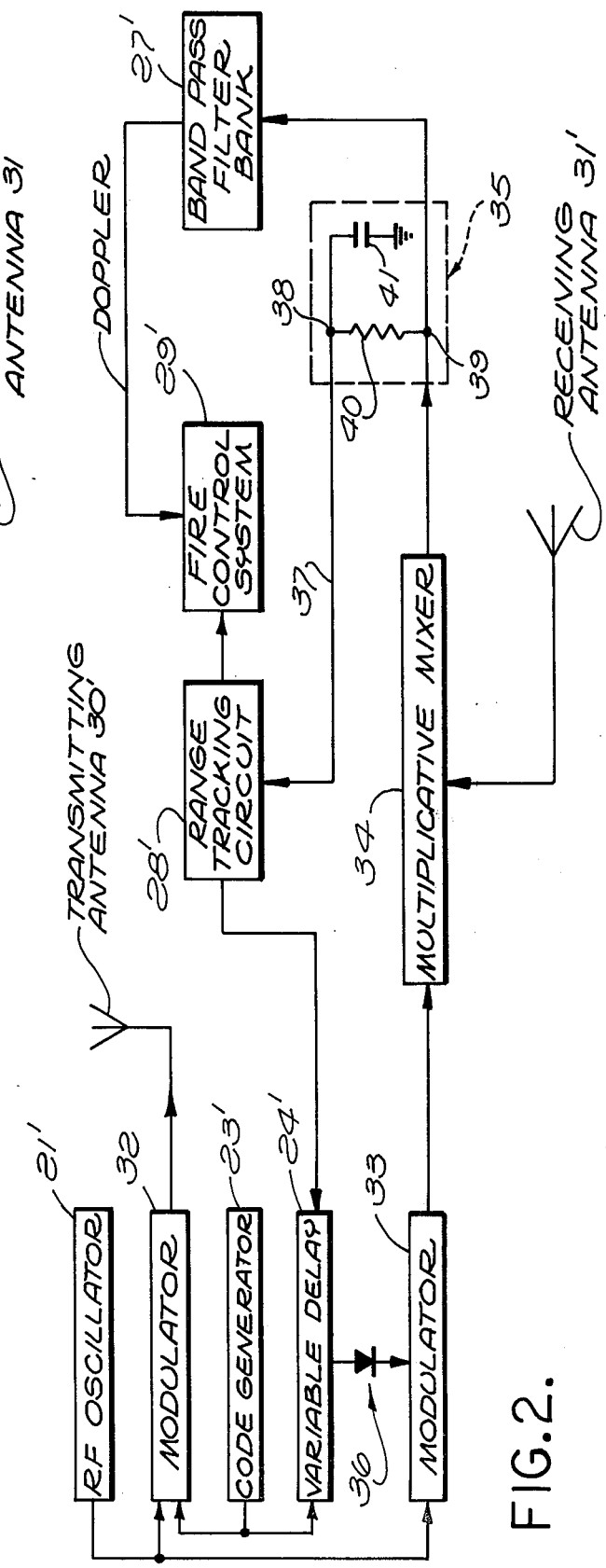
FIG. 1. PRIOR ART
FIG. 2.

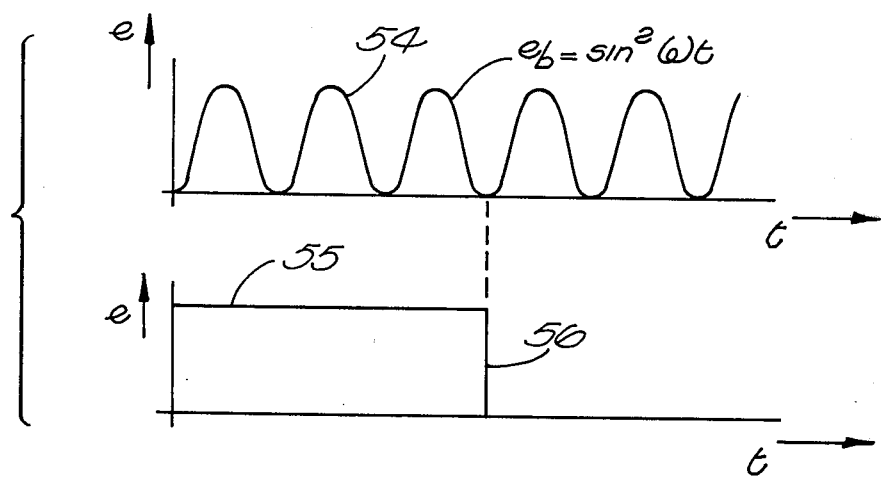
FIG. 5.
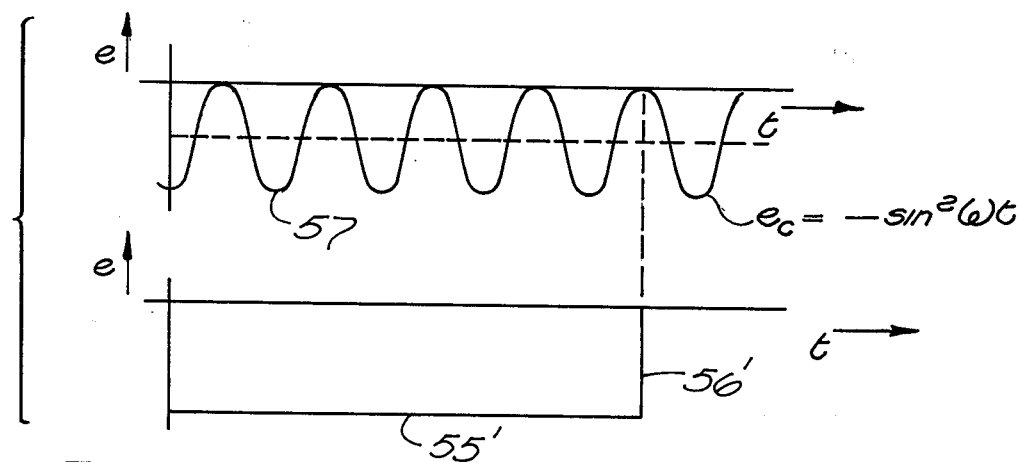
FIG. 6.
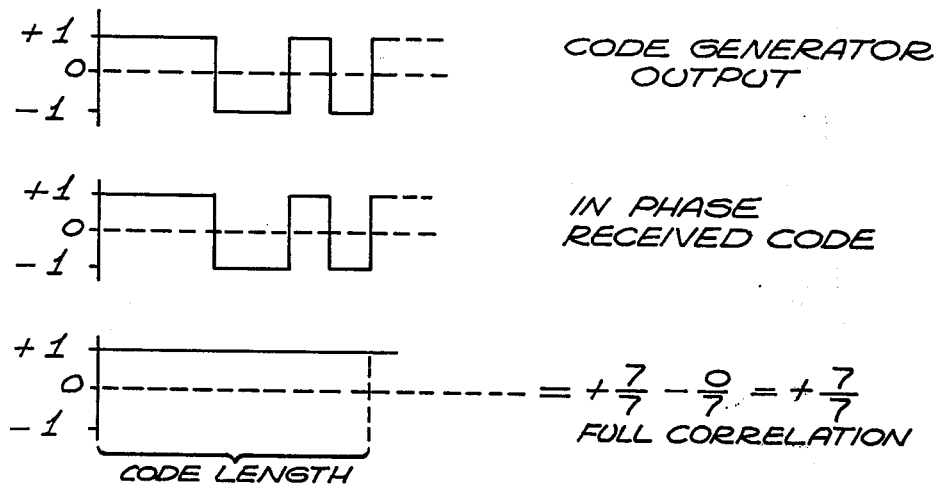
FIG. 7. PRIOR ART — CORRELATED

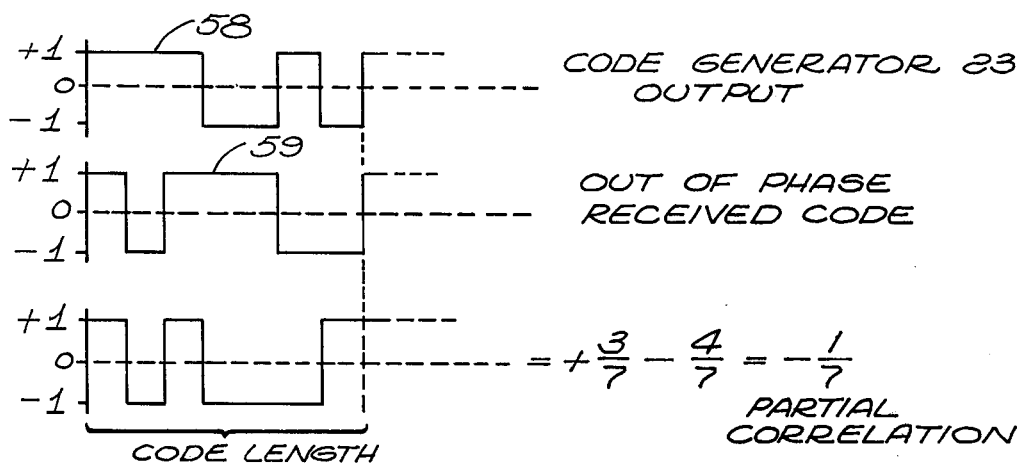
FIG. 8. PRIOR ART — PARTIAL CORRELATION
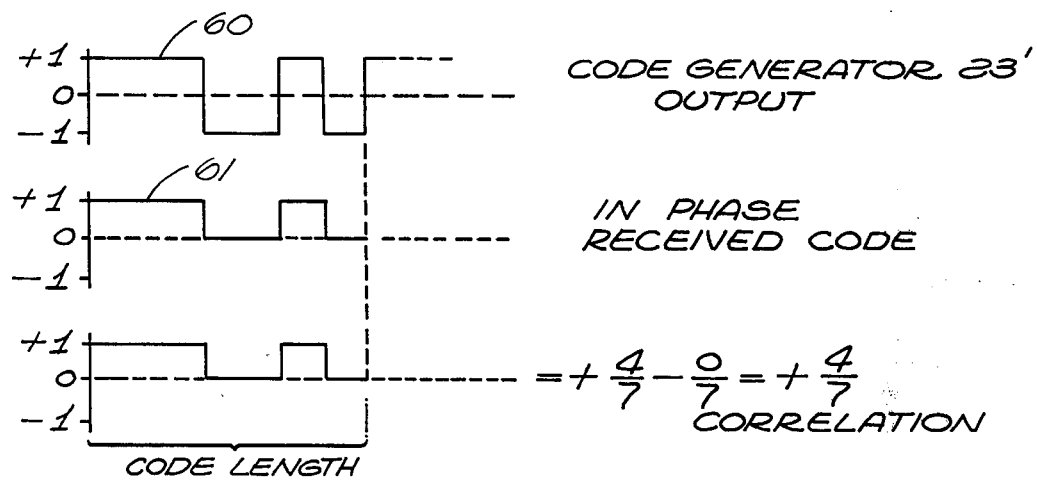
FIG. 9. THE INVENTION — CORRELATED
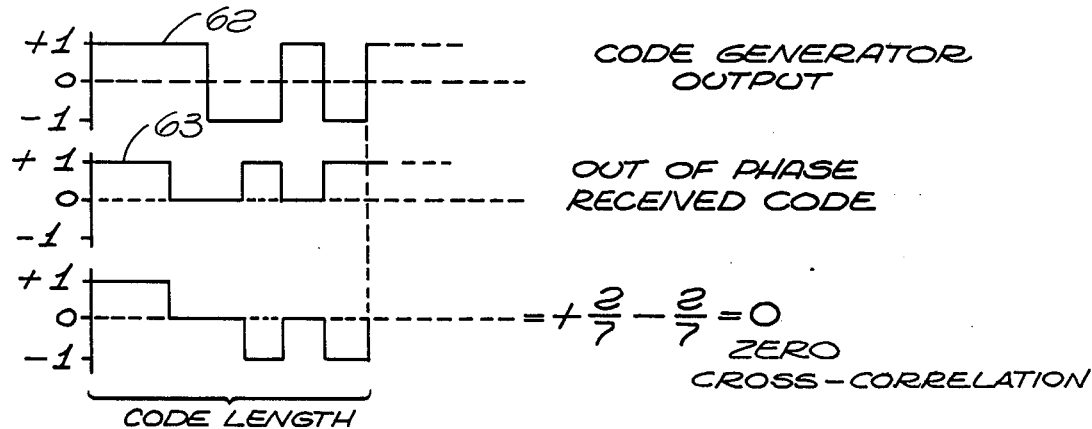
FIG. 10. THE INVENTION — ZERO CORRELATION

PSEUDO-NOISE RADAR SYSTEM

BACKGROUND OF THE INVENTION

This invention relates to radiant energy transceivers, and more particularly to a pseudo-noise radar.

In the past, pseudo-noise radar systems have exhibited moderately poor attenuation characteristics for phase shifts equal to one bit period to one bit period less than a word.

SUMMARY OF THE INVENTION

In accordance with the system of the present invention, the above-described and other disadvantages of the prior art are overcome by employing biphase and amplitude modulators with a multiplicative mixer. The mixer decodes the incoming signal by deriving product of biphase and amplitude modulated (AM) carriers where the AM carrier envelope is a maximal binary pulse code of amplitude zero or A, where A is always positive or always negative.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a block diagram of a prior art pseudo-noise radar system;

FIG. 2 is a block diagram of one embodiment of the present invention;

FIGS. 3, 4, 5 and 6 are graphs of a group of waveforms characteristic of the operation of the present invention as illustrated in FIG. 2;

FIGS. 7 and 8 are graphs of groups of waveforms characteristic of the operation of the prior art embodiment shown in FIG. 1;

FIGS. 9 and 10 are graphs of groups of waveforms characteristic of the operation of the present invention as illustrated in FIG. 2.

DESCRIPTION OF THE PRIOR ART EMBODIMENT ILLUSTRATED IN FIG. 1

Figure 3:
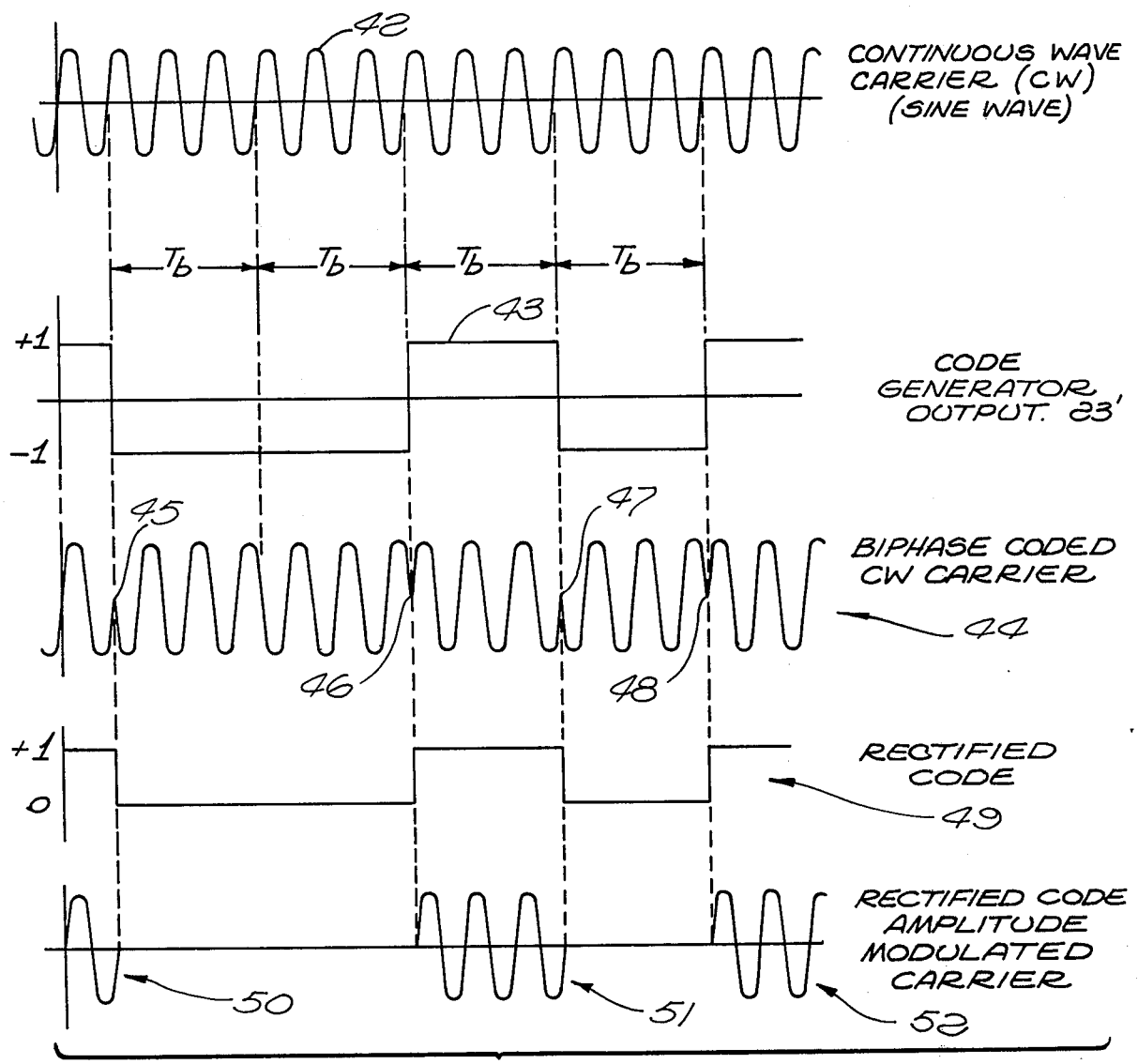

The prior art embodiment of FIG. 1 is illustrated at 20 and may be employed for fire control. However, the present invention is by no means limited to this use. A missile range and/or velocity tracking may be accomplished through the use of the present invention as well as many other functions.

At any rate, in FIG. 1, a radio frequency (RF) oscillator 21 is provided with a biphase modulator 22, a code generator 23, a variable delay 24, a biphase demodulator 25, a band pass filter bank 27, a range tracking circuit 28 and a fire control system 29. Each and every block shown in FIG. 1 may be entirely conventional, and the entire combination of the blocks shown in FIG. 1 may be entirely conventional. The same is true of a transmitting antenna 30, its connection with biphase modulator 22, and a receiving antenna 31, with its connection to biphase demodulator 25.

RF oscillator 21 is connected to one input of biphase modulator 22. The output of code generator 23 is impressed upon both biphase modulator 22 and variable delay 24. The output of biphase modulator 22 is connected to transmitting antenna 30. Variable delay 24 is provided with a second input from an output of range tracking circuit 28. The output of variable delay 24 is impressed upon biphase demodulator 25. Biphase demodulator 25 receives an additional input from receiving antenna 31 connected therefrom. The output of biphase demodulator 25 is impressed upon range tracking circuit 28 and upon band pass filter bank 27. The output of band pass filter bank 27 is the Doppler and is impressed upon fire control system 29 with another output from range tracking circuit 28.

Biphase modulator 22 is entirely conventional and, in accordance with a binary pulse code appearing at the output of code generator 23, reverses or not the phase of the RF oscillator 21.

Biphase modulators such as biphase modulator 22 and pseudo-noise code generators such as code generators 23, both shown in FIG. 1, are well known and have been described extensively in the prior art. If a reference thereto is desired, see, for example, "Modern Radar" edited by Raymond S. Berkowitz, page 378 (John Wiley & Sons, Inc., New York, copyright 1965).

The coded wave is radiated from transmitting antenna 30 connected from the output of biphase modulator 22. The reflected wave is picked up by receiving antenna 31 and impressed upon byphase demodulator 25, which receives the output of variable delay 24. The output of variable delay 24 is the same as the output of code generator 23 except that the code is delayed an amount depending upon the output of range tracking circuit 28 connected to variable delay 24. Range tracking circuit 28 thus forms a portion of a feedback loop which causes both inputs to biphase demodulator 25 to bear synchronous binary digital codes.

The output of code generator 23 is a binary pulse code, but the code is repeated in identical words, as is conventional.

The output of band pass filter bank 27, being the Doppler, supplies velocity information to the fire control system 29. The range tracking circuit 28 supplies range information to the fire control system 29.

DESCRIPTION OF THE PREFERRED EMBODIMENT

One of the embodiments of the present invention is illustrated in FIG. 2. In FIG. 2, an RF oscillator 21', a code generator 23', a variable delay 24', a band pass filter bank 27', a range tracking circuit 28', and a fire control system 29' may be, if desired, identical to RF oscillator 21, code generator 23, variable delay 24, band pass filter 27, range tracking circuit 28, and fire control system 29, respectively, shown in FIG. 1.

In FIG 2, modulators 32 and 33, a multiplicative mixer 34, and a low pass filter 35 are provided.

The output of RF oscillator 21' is connected to one input of each of the modulators 32 and 33. The output of code generator 23' is impressed upon the other input of modulator 32, and one input of variable delay 24'.

The output of modulator 32 is connected to transmitting antenna 30'.

Transmitting antenna 30' and a receiving antenna 31' shown in FIG 2 may be identical, if desired, to antennas 30 and 31, respectively, shown in FIG. 1.

As before, variable delay 24' receives an input from range tracking circuit 28'.

The output of variable delay 24' is connected to a second input of modulator 33 via a diode 36. Diode 36 may be poled as shown or in the opposite direction. Diode 36 may also be connected from the output of code generator 23' to the input therefrom to modulator 32 and poled in either direction. However, a diode is not employed both between delay 24' and modulator 33, and code generator 23' and modulator 32. That is, in this respect, only one diode such as diode 36 is employed.

The output of modulator 33 is connected to one input of mixer 34. The other input to mixer 34 is provided from receiving antenna 31'. The output of mixer 34 is connected to the input of filter 35 and band pass filter band 27'. Filter 35 is connected to range tracking circuit 28' over a lead 37 connected from a junction 38 in filter 35. Filter 35 has another junction 39. A resistor 40 is connected between junctions 38 and 39. A capacitor 41 is connected from junction 38 to ground.

OPERATION

As in the case of the prior art embodiment of FIG. 1, range tracking circuit 28 still causes the variable delay 24' to delay the output of code generator 23' so that the code on the incoming wave to receiving antenna 31' is in synchronism with the output of variable delay 24'.

Filter 35 simply filters the carrier to reproduce a high or low input to range tracking circuit 28' over lead 37 depending upon the degree of the correlation of the codes on the two input signals to mixer 34. Band pass filter bank 27', range tracking circuit 28' and the fire control system 29' otherwise may be identical to and operate individually and in combination in exactly the same manner as band pass filter bank 27, range tracking circuit 28 and fire control system 29 shown in FIG. 1.

At least one of the modulators 32 and 33 must be a biphase modulator. However, either one of the modulators 32 and 33 may be a biphase modulator. Further, if modulator 32 is a biphase modulator, modulator 33 must be an amplitude modulator. Conversely, if modulator 33 is a biphase modulator, modulator 32 must be an amplitude modulator. When the diode 36 is in the position shown in FIG. 2, modulator 33 must be the amplitude modulator and modulator 32 must be the biphase modulator.

If modulator 32 is the amplitude modulator, diode 36 must be connected from the output of code generator 23' to the corresponding input to modulator 32, and modulator 33 must be the biphase modulator.

The operation of the embodiment of the present invention illustrated in FIG. 2 may be better understood with references to FIGS. 3 to 11, inclusive.

The output of RF oscillator 21' may be a sine wave as indicated at 42 in FIG. 3.

Code generator 23' may have a bit period of $T_b$ as indicated by such legends in FIG. 3. The output of code generator 23' is illustrated at 43 in FIG. 3. This output generally has a amplitude of $+A$ or $-A$. For clarity, A is shown in FIG. 3 as being equal to $+1$. Note will be taken that waveform 43 does not remain at zero for any significant period of time. Waveform 43 is effectively only either positive or negative with respect to zero, and not equal to zero.

The code at 43 reverses the phase of carrier 42 as indicated at 44 in FIG. 3. Notice the unusual phase reversals at 45, 46, 47 and 48.

At 44, the phase reversals are shown where the carrier wave 42 has amplitude equal to zero. As a matter of fact, the code period $T_b$ is precisely three times the period of the carrier 42. This has been shown for clarity. However, as a practical matter, the bit period $T_b$ will almost never be an integral multiple of the period of the carrier 42. The relationship of the bit period and the carrier period and/or the relationship between the bit frequency and the carrier frequency is of no consequence except as indicated hereinafter.

The input to modulator 33 in FIG. 2 from diode 36 is illustrated at 49 in FIG. 3.

The output of modulator 33 is then a series of carrier bursts 50, 51 and 52 which are synchronous with the pulse code input to modulator 33 from diode 36 indicated at 49.

Note will be taken that the waveform at 49 is a pulse code, but this pulse code never falls below but falls to zero from a value of $+A$ or $+1$. The waveform at 49 is thus different from the waveform at 43.

If the timing of the input code to modulator 33 from diode 36 is in synchronism with the code of the wave transmitted by transmitting antenna 30' shown in FIG. 2, note will be taken that the two inputs to mixer 34 will either be in phase or 180° out of phase. If these two inputs are in phase, each will look as indicated at 53 in FIG. 4. The output of mixer 34 will then look as indicated at 54 in FIG. 4, waveform 54 being equal to the square of the function represented by waveform 53. The output of filter 35 over lead 37 to range tracking circuit 28' in FIG. 2 will then be an approximate D.C. as indicated by a dotted line 55 in FIG. 4.

Waveform 54 is repeated in FIG. 5. Line 55 in FIG. 5 represents the same line in solid form as the dotted line 55 in FIG. 4. Line 55 will be terminated at 56 and during a time to the right of line 56 should waveform 49 in FIG. 3 be zero. This is true because mixer 34 is a multiplicative mixer and the product of any finite amplitude and a zero amplitude is equal to zero.

Figure 4:
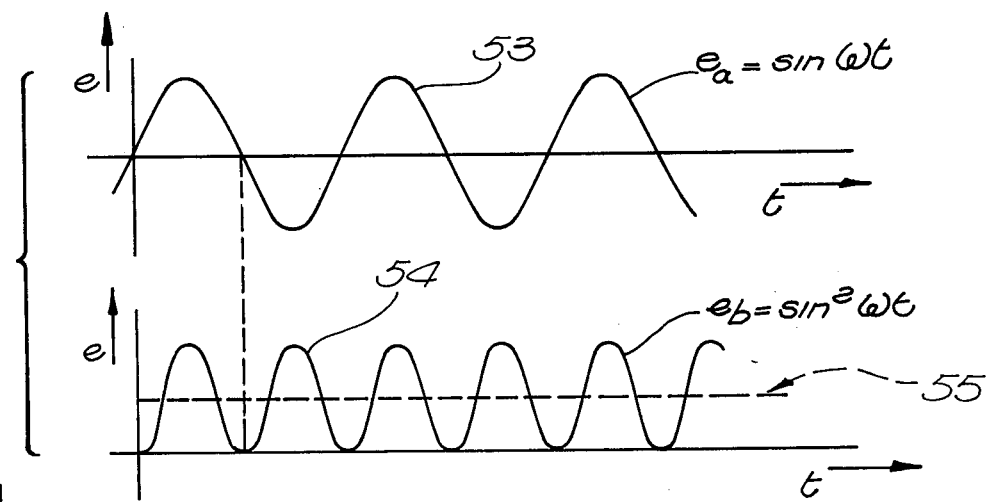

If the carrier inputs to mixer 34 are 180° out of phase, the square of waveform 53 in FIG. 4 with a negative sign will make the product as indicated at 57 in FIG. 6. Line 55' corresponds to line 55 in FIG. 5. Line 56' in FIG. 6 corresponds to line 56 in FIG. 5.

As will be recalled from FIG. 1, modulator 22 and demodulator 25 are both biphase. When the inputs to biphase demodulator 25 are in phase, the coded portions thereof will be in phase as illustrated in FIG. 7. The full correlation is then equal to $+1$.

In FIG. 8, the output of code generator 23 as indicated at 58 in FIG. 8 is out of phase with the code received via antenna 31 as indicated at 59. There is thus a partial correlation of $-1/7$, as shown.

As a typical example, a seven-bit code has been illustrated in each of the FIGS. 7-10, inclusive.

In accordance with the present invention as shown in FIG. 9, the output of code generator 23' is illustrated at 60 in phase with a received code 61 giving a correlation of $+4/7$.

In accordance with the present invention, when the outgoing and incoming codes are out of phase as indicated at 62 and 63 in FIG. 10, the cross-correlation is zero. This means that there is an extremely high degree of out-of-phase signals.

Figure 11:
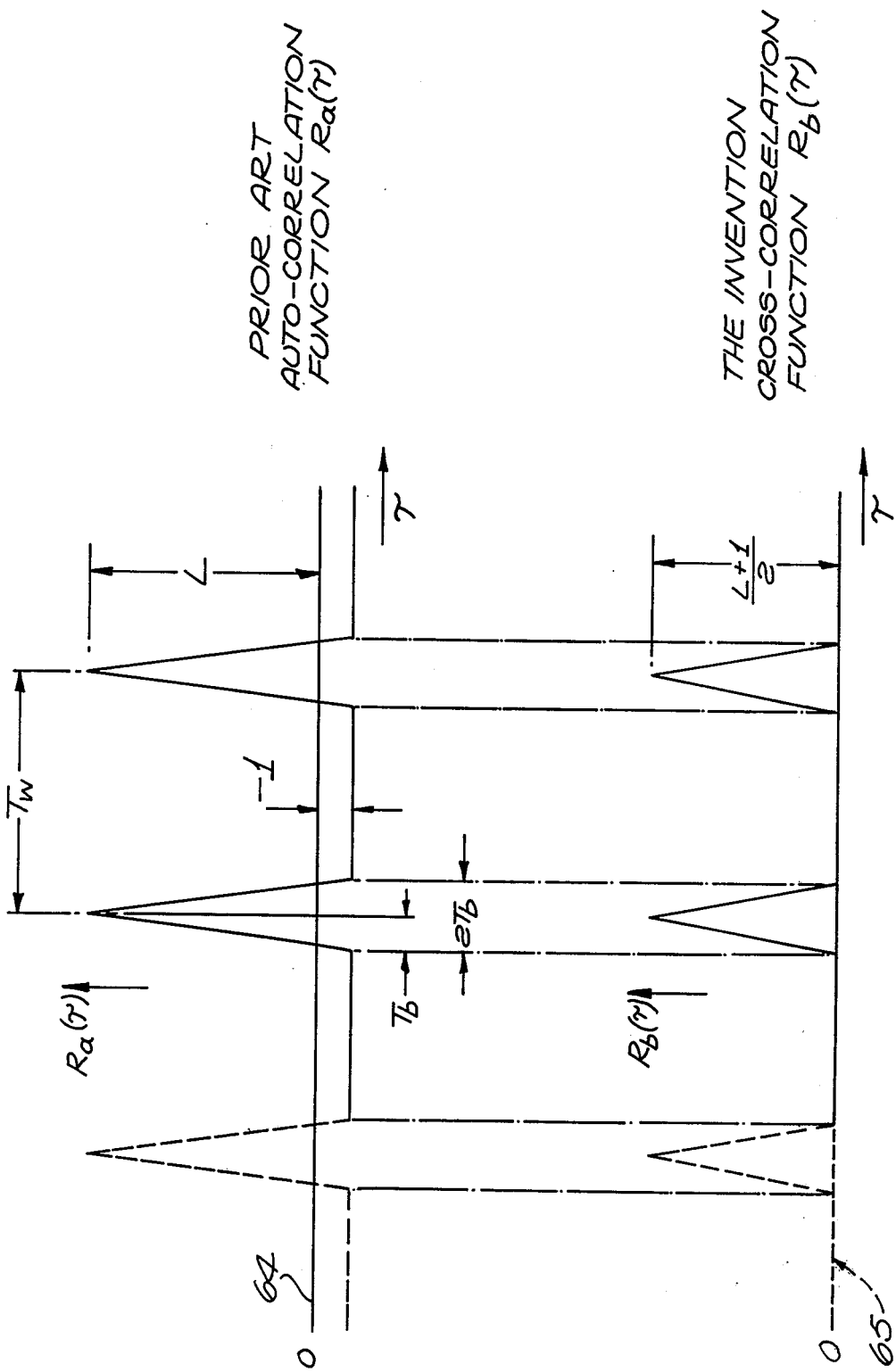
FIG. 11 is a graph of the autocorrelation function of the upper two waveforms shown in each of FIGS. 7 and 8, and the cross-correlation function of the upper two waveforms shown in each of FIGS. 9 and 10.

The autocorrelation function of the two input codes to biphase demodulator 25 shown in FIG. 1 is illustrated as the autocorrelation function $R_a(\tau)$ in FIG. 11.

The cross-correlation function of the two input codes to mixer 34 in FIG. 2, in accordance with the present invention, is illustrated at $R_b(\tau)$ in FIG. 11. The existence of the autocorrelation function $R_a(\tau)$ at a level of −1 or −A below the zero line 64 in FIG. 11 results in discrimination degradation.

Note that the cross-correlation function $R_b(\tau)$ in FIG. 11 has a zero line 65 below which $R_b(\tau)$ does not sink. An infinite theoretical discrimination improvement is therefore possible.

In FIG. 11, the word period is $T_w$. The dimension L is the length of the word in terms of number of bits.

The term L always contains a maximal length code in accordance with the present invention. In accordance with the present invention, the term L is thus always defined as follows:

$$L = 2^n - 1 \quad (1)$$

where $n$ is any positive integer, but for good discrimination against noise, $n$ is as large as practical. For example, L may or may not be defined as $$L \gg 1 \quad (2)$$

For a complete discussion of and definition of the word "maximal" and portions of the following, see the said "Modern Radar" book.

It is known that the autocorrelation function of a maximal length biphase code $u(t)$ which is a function of time $t$ and which is restricted to being, for example, +1 or −1 is $$\int_a^{L+a} u(t) u(t - \tau) \, dt \quad (3)$$

where $a$ is any arbitrary constant.

It is also known that the integral of (3) may be evaluated for $$\tau = +p T_b \quad (4)$$

wherein $p$ is any positive integer except when $$p \neq (L)(K - 1) \quad (5)$$

where $K$ is any positive integer.

For $\tau = +p T_b$ the integral of (3) is equal to −1. When $$\tau = +(L)(K - 1) \quad (6)$$

the integral of (3) may be evaluated and is then always equal to L.

It is known that the average value of a maximal length biphase code is always +1. Thus, $$\int_a^{L+a} u(t) \, dt = +1 \quad (7)$$

Recapping $$\int_a^{L+a} u(t) u(t - \tau) \, dt = L \text{ for (6)} - 1 \text{ for (4)} \quad (8)$$

$$\int_a^{L+a} u(t) \, dt = +1 \quad (9)$$

Dividing both sides of both equations (8) and (9) by 2, $$\int_a^{L+a} [u(t)] \left[ \frac{u(t - \tau)}{2} \right] dt = \frac{L}{2} \text{ for (6)} - \frac{1}{2} \text{ for (4)} \quad (10)$$

$$\int_a^{L+a} \frac{u(t)}{2} = +\frac{1}{2} \quad (11)$$

Adding equation (11) to equation (10), $$\int_a^{L+a} [u(t)] \left[ \frac{1}{2} + \frac{u(t - \tau)}{2} \right] dt = \quad (12)$$

$$\frac{L + 1}{2} \text{ for (6) zero for (4)}$$

Zero for (4)! Theoretical infinite discrimination! In the conventional biphase system of FIG. 1, the autocorrelation function for a seven bit word is about $\log_{10} 1/7$ or −8.5 decibels. In accordance with the present invention a cross-correlation function of −70 decibels or more is possible! An improvement of over 823 percent!

The cross-correlation function of equation (12) is $R_b(\tau)$ of FIG. 11 and is mechanized in the following manner.

Note that if waveform 43 in FIG. 3 is $u(t - \tau)$ is divided by 2 the maxima and minima become equal to $+\frac{1}{2}$ and $-\frac{1}{2}$. Note $$u(t - \tau)/2 \quad (13)$$

in (12).

Then suppose we add $+\frac{1}{2}$ to the wave that has just been divided by 2. The result is pulses of amplitude +1, amplitude zero between pulses, and no negative values. Note that we have just described waveform 49 in FIG. 3. Also note the phrase "add $+\frac{1}{2}$" appearing in the first sentence of this selfsame paragraph comes from the "$\frac{1}{2}$" which appears in equation (12).

Maximal length codes are further described in U.S. Pat. No. 3,678,507.

Use of the present invention may be made in connection with many systems including but not limited to that disclosed in U.S. Pat. No. 3,641,573, and that disclosed in copending application Ser. No. 458,808 filed Apr. 8, 1974, now abandoned, by D. F. Albanese and R. Waer for LARGE AREA MOTION SENSOR USING PSEUDO-NOISE TECHNIQUE, assigned to the assignee of this application.

Multiplicative mixer 34 shown in FIG. 2 may be any conventional mixer such as one which produces an output proportional to the product of two inputs.

Each individual box shown in FIG. 2 may be entirely conventional, but not the combination thereof. The use of diode 36 is new, but many equivalents thereof will, of course, suggest themselves to those skilled in the art.

By this reference hereto, said copending application is incorporated herein as though fully set forth hereat.

Variable delay 24' in FIG. 2 need not be variable in all applications. This is disclosed in said copending application.

Diode 36 shown in FIG. 2 may be connected from code generator 23' to delay 24', if desired, and the output of delay 24', in this case, can be connected directly to the horizontally centered input of modulator 33 directly and simply by a conductive lead only in lieu of diode 36.

Note that the pulses of waveform 49 in FIG. 3 have a width $mT_b$ where $m$ is any positive integer depending upon the word code and pulse selected.

The word rate will preferably be at least twice as large or larger than the maximum expected Doppler.

The present invention may be employed to detect the range or velocity of an airborne or other object, for range or velocity tracking or for other purposes.

What is claimed is:

1. A pseudo-noise radar system with effectively zero amplitude cross-correlation function for a phase shift of one bit or more to one bit less than a word, said system comprising: a radio frequency (RF) oscillator having an output and being provided to produce an output signal thereat; first and second modulators each having first and second inputs and an output; a transmitting antenna connected from the output of said first modulator; a multiplicative mixer having first and second inputs, and an output; utilization means connected from the output of said multiplicative mixer; a receiving antenna, the output of said second modulator and said receiving antenna being connected to said first and second multiplicative mixer inputs, respectively, the first inputs of said first and second modulators both being connected from said RF oscillator output; and code generator means having first and second outputs, one of said first and second modulators being a biphase modulator, the other of said first and second modulators being an amplitude modulator, both of said first inputs of said first and second modulators being connected from said RF oscillator output, said code generator means first and second outputs being connected to the second inputs of said one and said other of said modulators, respectively, said code generator means producing a first signal at said first output thereof to said one modulator to produce an output signal at the output thereof which is in phase for one or more equal, but either spaced or successive first time periods $T_b$ with said Rf oscillator output signal, and which is 180° out of phase for one or more equal, but either spaced or successive second time periods $T_b$, said first and second time periods occurring consecutively, said code generator means producing a second signal at said second output thereof of pulses of widths equal to $mT_b$ and of a constant amplitude where $m$ is any positive integer, said second signal having a zero amplitude between said $mT_b$ pulses, said second signal being formed into a binary pulse code having equal successive word lengths, each successive word having a maximal binary pulse code identical to the next preceding word, said pulses $mT_b$ occurring synchronously with the singular or successive ones of one of said first and second periods.

2. The invention as defined in claim 1, wherein said code generator means includes a code generator having an output connected to one of said code generator means outputs, a delay having an input and an output, said delay input being connected from said code generator output, auxiliary means connecting the other of said code generator means outputs and said delay output, said one code generator means output being connected to the second input of said first modulator, the other code generator means output being connected to the second input of said second modulator.

3. The invention as defined in claim 2, wherein said auxiliary means is a diode, said code generator producing a square wave output of maximum amplitude $+A$, minimum amplitude $-A$, and mark to space ratio of 1:1.

* * * * *